United States Patent [19]
Ando

[11] Patent Number: 5,138,479
[45] Date of Patent: Aug. 11, 1992

[54] LIGHT BEAM SCANNING APPARATUS AND METHOD OF DETECTING A VARIATION OF A SCANNING SPEED OF A LIGHT BEAM

[75] Inventor: Toshinori Ando, Yokohama, Japan

[73] Assignee: Canon Kabushiki Kaisha, Tokyo, Japan

[21] Appl. No.: 587,846

[22] Filed: Sep. 25, 1990

[30] Foreign Application Priority Data

Sep. 26, 1989 [JP] Japan .................. 1-249863

[51] Int. Cl.$^5$ .............................. G02B 26/10
[52] U.S. Cl. ..................... 359/216; 359/196; 250/234
[58] Field of Search ............... 359/196, 212, 213, 216, 359/217, 218, 219; 250/234, 235, 236; 358/296, 486

[56] References Cited
U.S. PATENT DOCUMENTS

| | | | |
|---|---|---|---|
| 3,848,087 | 11/1974 | Carrell | 359/217 |
| 4,205,350 | 5/1980 | Gunning | 359/216 |
| 4,714,830 | 12/1987 | Usui | 250/234 |
| 4,841,135 | 6/1989 | Goto et al. | 359/217 |
| 4,962,981 | 10/1990 | Murakami et al. | 359/217 |

*Primary Examiner*—Loha Ben
*Attorney, Agent, or Firm*—Fitzpatrick, Cella, Harper & Scinto

[57] ABSTRACT

A light beam scanning apparatus has a light source, a deflecting element for deflecting a light beam from the light source, such as a rotary polygon mirror, a drive component for driving the light source, a measuring means for detecting the light beam deflected by the deflection element and measuring the scanning speed of the light beam, and a control system for controlling the drive component in accordance with signals from the measuring device. According to this composition, even if the scanning speed is cyclically changed in each scanning, it is possible to restrain an image on a medium to be scanned from being deteriorated by the change.

12 Claims, 7 Drawing Sheets

LIGHT BEAM SCANNING APPARATUS AND METHOD OF DETECTING A VARIATION OF A SCANNING SPEED OF A LIGHT BEAM

BACKGROUND OF THE INVENTION

1. Field of the Invention

The present invention relates to a light beam scanning apparatus for use in an image forming apparatus, such as a laser beam printer and the like.

2. Related Background Art

Figure 1:
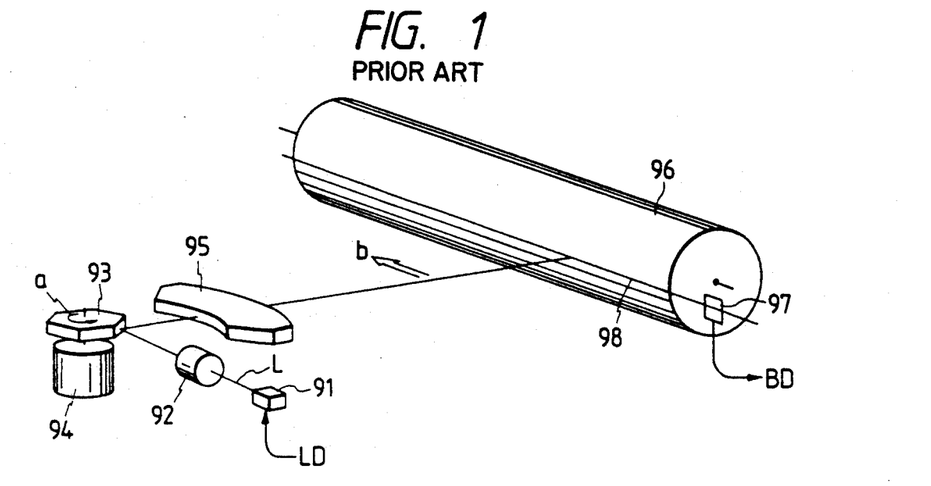
FIG. 1 is a view of a conventional light beam scanning apparatus.

The composition of a conventional light beam scanning apparatus in, for example, a laser beam printer, is as shown in FIG. 1. Referring to FIG. 1, a laser beam L radiated from a laser source 91, such as a semiconductor laser element, is collimated by a collimator lens 92 and then radiated onto a deflecting reflection plane of a rotary polygon mirror 93. The polygon mirror 93 has a plurality of (for example, six) deflecting reflection planes and is rotated at constant speed by a constant speed rotary motor 94 in the direction of the arrow "a" in FIG. 1, thereby sequentially deflecting and scanning the light beam L incident thereon through the collimator lens 92 in the direction of the arrow "b" in FIG. 1. A scanning lens 95 is disposed in the optical path between the rotary polygon mirror 93 and a plane to be scanned, images the laser beam deflected and scanned by the rotary polygon mirror 93 in a spot onto a photoconductive drum 96 as a plane to be scanned, and scans the laser beam at a constant speed.

A light sensing element 97 for generating a horizontal synchronizing signal to determine an image start position on the plane to be scanned is mounted on the scan start side on a laser beam scanning line 98. A signal (referred to as a "BD signal" hereinafter), which is output from the light sensing element 97 when the laser beam L passes by the light sensing element 97, is used to synchronize the start of an image signal in each scanning. In other words, when a predetermined time is delayed after the BD signal is given in each scanning, an unillustrated control unit starts to modulate the laser source 91 in accordance with a laser drive signal LD corresponding to the image signal so as to perform a scanning operation.

As a result, even if the scanning speed of the laser beam is changed by unevenness of the rotation speed of the constant speed rotary motor 94 or the like, the image start position on the photoconductive drum 96 in each scanning can be controlled to be substantially constant.

However, such a conventional apparatus cannot compensate for a change in the scanning speed while an image is being formed. In other words, even if, according to the conventional apparatus, the image start position in each scanning can be synchronized by modulating the light source in accordance with the image signal so as to form an image when a predetermined time is delayed after the BD signal is given, when the scanning speed is changed while scanning, an image end position changes on each scanning line and this causes what is called a jitter error.

In particular, if a large jitter error appears in a comparatively short cycle of several scanning lines, a printing position is shifted on the scanning end side, a character pattern is disarranged, and predetermined halftone density can not be obtained in a halftone output by modulating a dither, a density pattern or the pulse width, so that printing quality is considerably lowered.

The prime cause of the jitter of a short cycle is precision in the shape of each plane of the rotary polygon mirror 93. Generally, in a scanning plane which is a luminous plane formed with time by a laser beam deflected by a deflecting reflection plane, when the deflecting reflection plane is convex, the scanning speed is high, and, on the contrary, when the deflecting reflection plane is concave, the scanning speed is low. The shape of the plane is distorted by the centrifugal force in the operation of the polygon mirror 93, the rise in temperature, and the process precision determined in processing. In order to make the jitter of a short cycle sufficiently small, it is necessary to enhance the process precision, improve the method of retaining the polygon mirror and take measures against a rise in temperature and therefore design and production costs are increased.

SUMMARY OF THE INVENTION

With the problems of the above conventional apparatus in view, an object of the present invention is to provide a light beam scanning apparatus which can reduce the influence on the quality of an image on a medium to be scanned even if a cyclic scanning speed is changed in the same manner as in the conventional apparatus.

In order to achieve the above object, the present invention provides a light beam scanning apparatus for scanning a light beam from a light source onto a predetermined scanning line on a medium to be scanned, such as a photoconductive drum, by using a deflector, which includes a measuring means for measuring a cyclic change in the scanning speed of the light beam in each scanning and in which radiation of the light beam from the light source is controlled according to measurement results obtained by the measuring means.

Specifically, the measuring means measures the cyclic change in the scanning speed by measuring the time it takes for the light beam to pass between predetermined two points on the scanning line and the distance at which the light beam moves in a predetermined period, and furthermore, it changes an image signal transmitting clock to control the radiation of the light beam from the light source. The image signal transmitting clock is changed by changing the phase or the cycle of the clock with a proper means so as to reduce the influence of the jitter error.

The measuring means also measures a change in the scanning speed in the cycle of each deflecting reflection plane of the rotary polygon mirror as a deflector.

As described above, even if the scanning speed is cyclically changed, it is possible to reduce the influence of the change on the quality of an image on a medium to be scanned.

DESCRIPTION OF THE PREFERRED EMBODIMENT

The preferred embodiments of the present invention will now be described with reference to the drawings.

Figure 2:
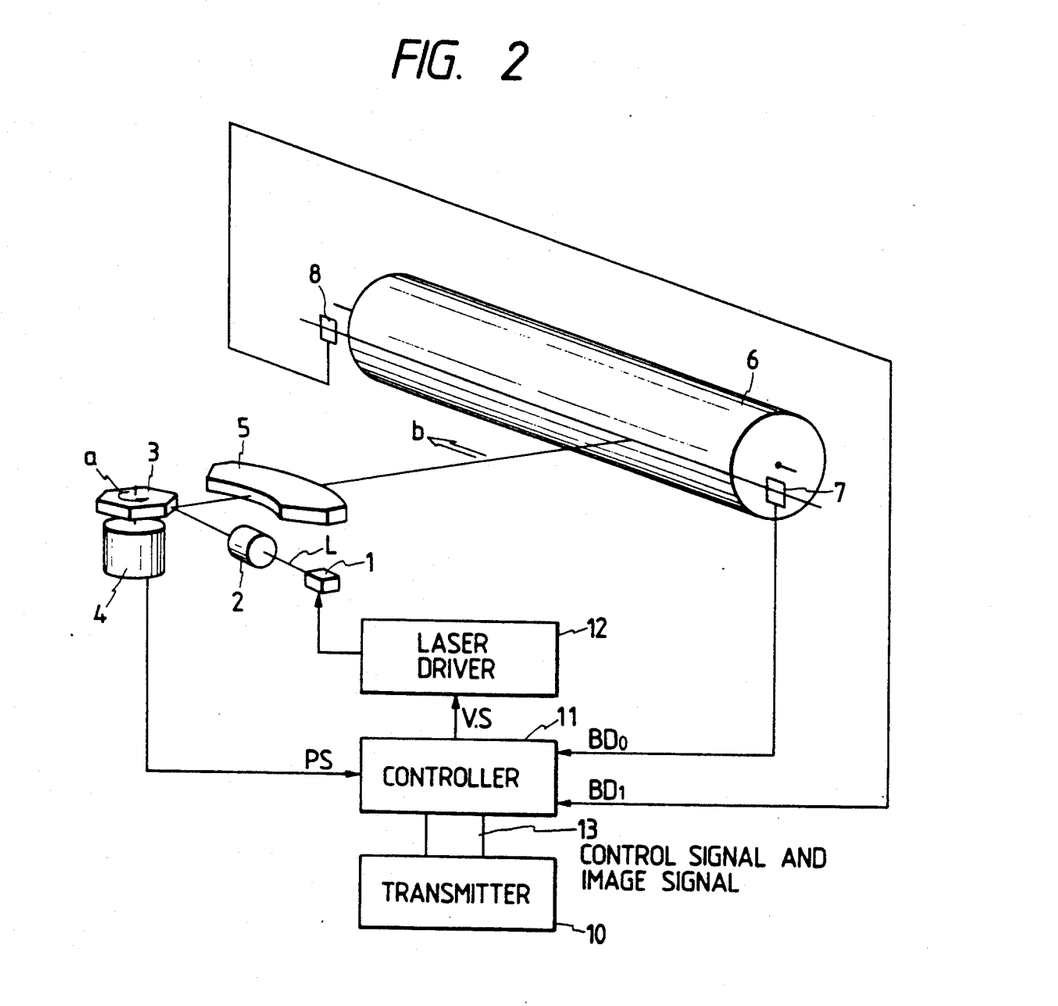
FIG. 2 is a schematic view showing the composition of a light beam scanning apparatus according to an embodiment of the present invention.

FIG. 2 schematically shows the composition of an embodiment in which a light beam scanning apparatus of the present invention is applied to a laser beam printer. Referring to FIG. 2, the light beam scanning apparatus comprises a semiconductor laser element 1 as a light source, a collimator lens 2, a rotary polygon mirror, that is, a polygon 3, a drive unit 4 for rotating the polygon 3 at a constant speed and generating a polygon synchronizing signal PS at each rotation of the polygon 3, a scanning lens 5 and a photoconductive drum 6 for a electrophotographic mechanism as a plane to be scanned. The functions of these components are the same as those described in FIG. 1.

A first light sensor 7 is mounted on the scanning start side on a scanning line and detects a scanning start signal $BD_0$, and a second light sensor 8 is mounted on the scanning end side on the scanning line and detects a scanning end signal $BD_1$.

A laser beam L from the laser source 1, which is modulated according to laser drive signals from a laser driver 12, is imaged in a spot onto the photoconductive drum 6 and scanned at a constant speed. At this time, when the laser beam L passes on the light sensor 7, the scanning start signal $BD_0$ is output from a sensing element of the light sensor 7, and when the laser beam L passes on the light sensor 8, the scanning end signal $BD_1$ is output from a sensing element of the light sensor 8. As described above, the polygon synchronizing signal PS is generated from the polygon drive unit 4 a each rotation of the polygon 3. The scanning start signal $BD_0$, the scanning end signal $BD_1$ and the polygon synchronizing signal PS are connected to a scanning speed measuring circuit, described below, in order to detect the light beam scanning speed deviation in accordance with the shape of each plane of the polygon 3.

An electrostatic latent image is formed on the photoconductive drum 6 by the laser beam imaged and scanned onto the photoconductive drum 6 and developed into a visible image by a developing device (not shown). The visible image is transferred onto a recording material supplied from an unillustrated cassette, fixed on the recording material by passing through an unillustrated fixing device, and ejected as a hard copy to an unillustrated eject portion.

Numeral 10 denotes a transmitter of image signals in an image reading apparatus having a solid state imaging device, such as a CCD, a reproduction apparatus for reading out image information magnetically recorded, an office computer or the like.

The transmitter 10 and a controller 11 are connected through a control signal and image signal line 13.

The controller 11 controls each component of the light beam scanning apparatus and responds to the transmitter 10 according to the control signals from the transmitter 10. The scanning start signal $BD_0$ and the scanning end signal $BD_1$ respectively from the light sensors 7 and 8 and the polygon synchronizing signal PS from the polygon drive unit 4 are input to the controller 11, and the controller 11 measures the time from the detection of the scanning start signal $BD_0$ to the detection of the scanning end signal $BD_1$ for each deflecting reflection plane of the polygon 3, and controls the image start position on the photoconductive drum 6 in accordance with the measurement results. The laser driver 12 modulates and drives the semiconductor laser 1 in accordance with image signals V.S transmitted from the controller 11.

Figure 3:
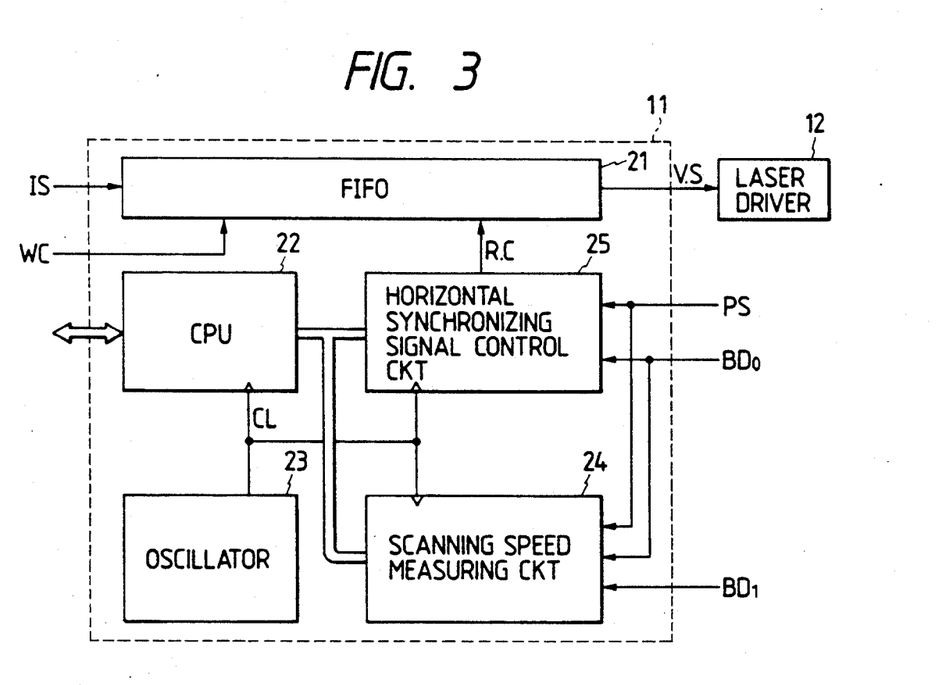
FIG. 3 is a block diagram showing the composition of a controller shown in FIG. 2.

FIG. 3 is a block diagram showing the composition of the controller 11 shown in FIG. 2. Referring to FIG. 3, image signals IS transmitted from the transmitter 10 are written into a first-in first-out memory 21 in synchronization with a writing clock signal WC from the transmitter 10. A CPU 22 makes contact with the transmitter 10 or controls each block in the controller 11 and each unit in the light beam scanning apparatus. An oscillator 23 outputs a clock CL which is used to time the operation of each unit in the light beam scanning apparatus and furthermore to measure the scanning speed described below. A scanning speed measuring circuit 24 is operated to measure the scanning speed and measure the time from the detection of the scanning start signal $BD_0$ to the detection of the scanning end signal $BD_1$ based on the clocks CL. The polygon synchronizing signal PS is input to the scanning speed measuring circuit 24 and the scanning speed for an optional deflecting reflection plane of the polygon 3 can be measured by using the polygon synchronizing signal PS. A horizontal synchronizing signal control circuit 25 is operated to form an image on the plane to be scanned in the light beam scanning apparatus and outputs an image signal transmitting clock R.C to the FIFO 21 after the light sensor 7 detects the scanning start signal $BD_0$ and the number of clocks CL predetermined for each deflecting reflection plane are counted. The image signal transmitting clock R.C is generated by dividing the clock CL. An image is written on the photoconductive drum 6 by modulating the laser beam in accordance with the image signals V.S and in synchronization with the image signal transmitting clock R.C.

As described above, in the light beam scanning apparatus of the present invention which scans a light beam from a light source on a predetermined scanning line on a medium to be scanned by using a deflector, a measuring means for measuring a cyclic change in the scanning speed of the light beam in each scanning by each deflecting reflection plane of the deflector is mounted and the control of the radiation of the light beam from the light source is changed in accordance with the measurement results obtained by the measuring means.

More specifically, the measuring means measures the time it takes for the light beam to pass between two predetermined points on the scanning line. Furthermore, as described in the embodiment described below, the measuring means may measure the distance the light beam moves in a predetermined period.

Figure 4:
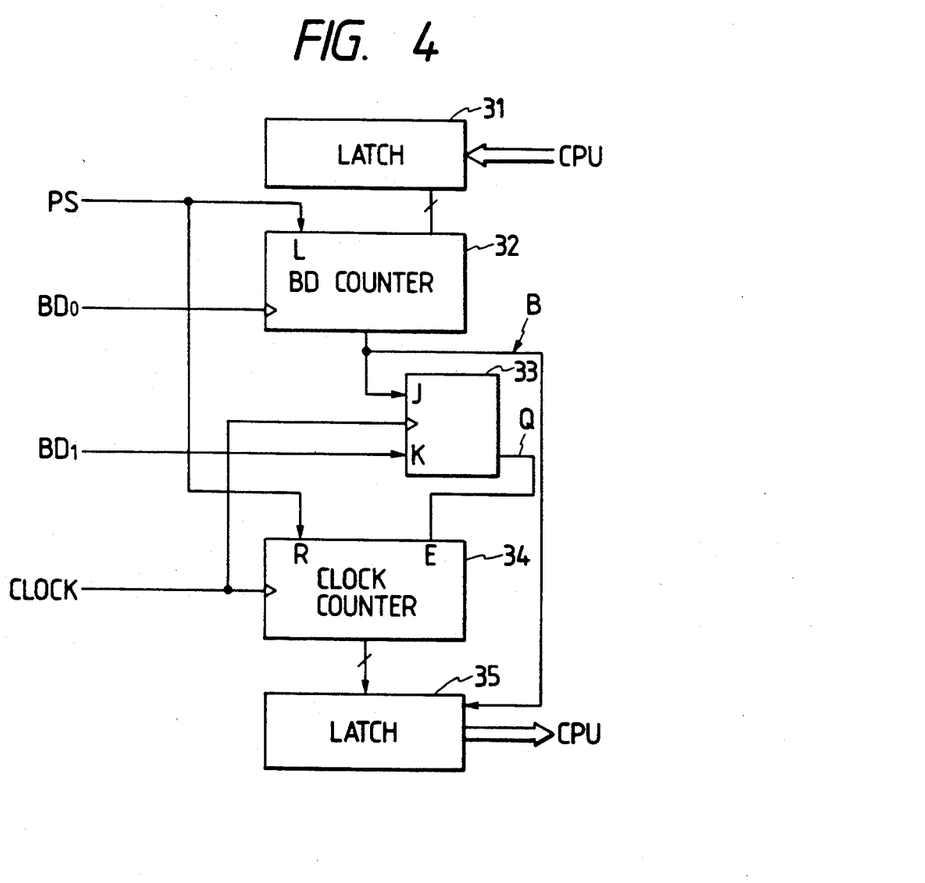
FIG. 4 is a block diagram of a scanning speed measuring circuit.

FIG. 4 is a block diagram showing an embodiment of the scanning speed measuring circuit. In this circuit, the time it takes for the light beam L to scan between the scanning start signal sensor 7 and the scanning end signal sensor 8 is measured based on the count value of a clock counter. Referring to FIG. 4, the circuit comprises a plane designating latch 31 for designating a deflecting reflection plane of the polygon 3 to be measured, a BD counter 32 for counting down the scanning start signal $BD_0$, a flip-flop 33 for receiving a borrow signal B from the BD counter 32 and the scanning end signal $BD_1$ as inputs, a clock counter 34 for counting the clock CL generated by the oscillator 23 and a count value latch 35 for holding the value of the clock counter 34 in a desired timing. The clock CL selects its cycle in accordance with the amount of the jitter error to be measured, and, for example, it is preferable to set the cycle of the clock CL to a certain fraction of that of the image signal transmitting clock R.C.

Figure 5:
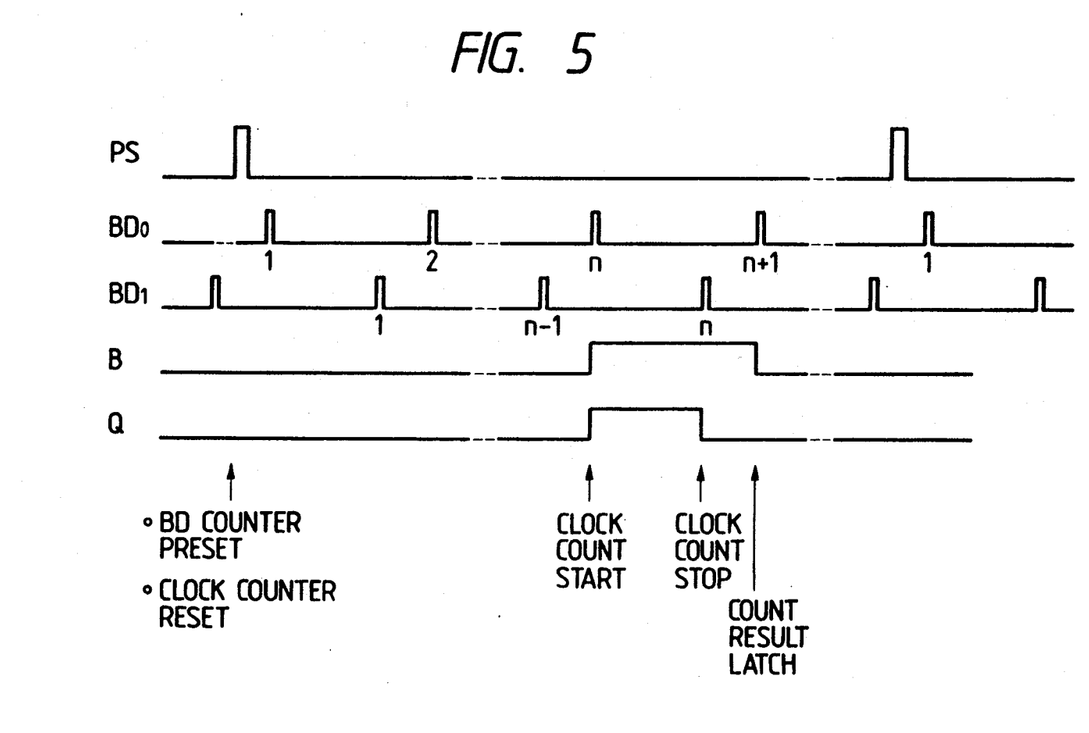
FIG. 5 is a timing chart explaining operations of the measuring circuit shown in FIG. 4.

The operations of the measuring circuit shown in FIG. 4 will now be described with reference to the timing chart shown in FIG. 5.

The value corresponding to the deflecting reflection plane of the polygon 3 to be measured is written from the CPU into the plane designating latch 31. The content of the plane designating latch 31 is preset as an initial value in the BD counter 32 the moment the BD counter 32 is reset in response to the polygon synchronizing signal PS from the polygon drive unit 4. The BD counter 32 counts down the scanning start signal $BD_0$ from the preset initial value, and outputs the borrow signal B when the count result becomes negative. The clock counter 34 is set at 0 beforehand by the synchronizing signal PS, and since an enable terminal E is connected to an output Q of the flip flop 33, which is set in response to the borrow signal B and reset in response to the next scanning end signal $BD_1$, the clock counter 34 counts the clock signals CL between the scanning start signal $BD_0$ and the scanning end signal $BD_1$ in the predetermined nth (designated by the plane designating latch 31) scanning after the synchronizing signal PS is given. The count result is stored in the latch 35 and then read into the CPU.

By repeating the above operations a predetermined number of times while changing the value of the plane designating latch 31, it is possible to put the count values relative to all deflecting reflection planes of the polygon 3 into the CPU. Thus, the change in the scanning speed in the cycle of each plane of the rotary polygon mirror as a deflector is measured.

The CPU calculates the count value deviation $\Delta i$ in each deflecting reflection plane of the polygon 3 based on the above measured values. If it is assumed that the number of planes of the polygon 3 is n and the measured count values in each plane are $m_1, m_2, \ldots, m_n$, and m is an average value of the count values for all the planes, the count value deviation $\Delta i$ of each plane of the polygon 3 is as follows:

$$\Delta i = m_i - m \ (i = 1 \sim n)$$

When the pixel slippage corresponding to the clock pulse CL1 is d, the jitter error Ei is represented as follows:

$$Ei = \Delta i \cdot d \ (i = 1 \sim n)$$

Figure 6:
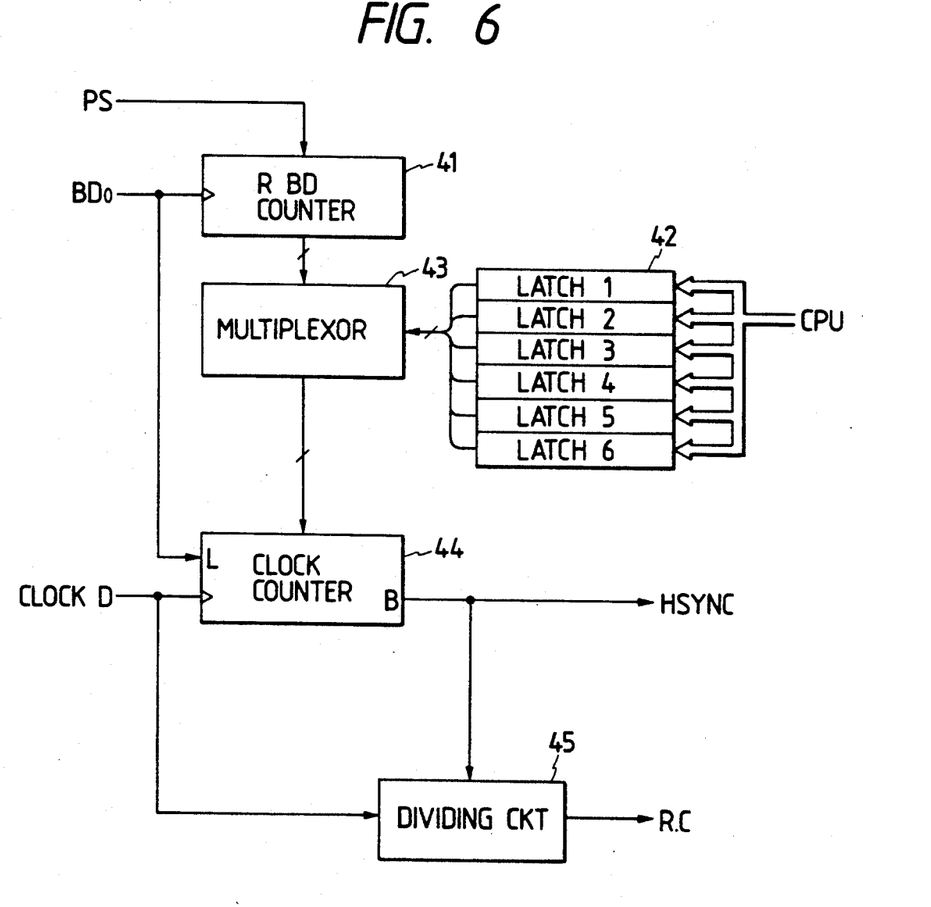
FIG. 6 is a block diagram of a horizontal synchronizing signal control circuit.
Figure 7:
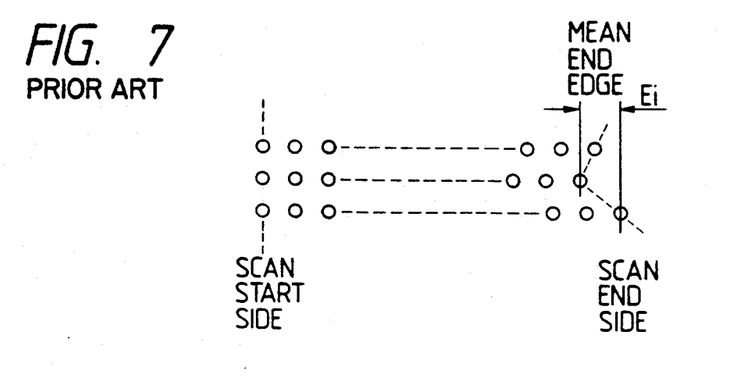
FIG. 7 is a view showing an example of print pixel positions in the conventional apparatus.
Figure 8:
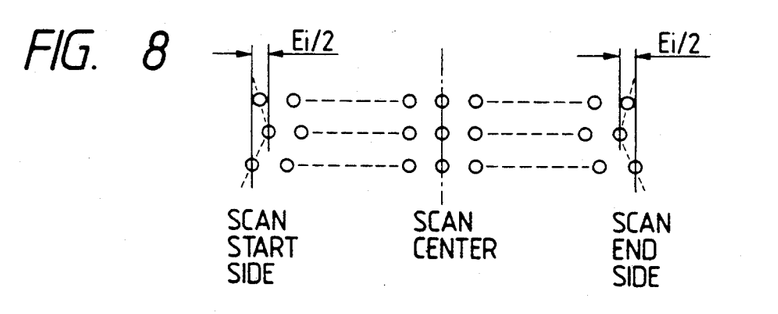
FIGS. 8 and 9 are views showing embodiments of print pixel positions in the case that the amount of a jitter error is compensated according to the present invention.

FIG. 6 shows an embodiment of a means for compensating for a jitter error based on the count value deviation $\Delta i$ for each plane. In the conventional apparatus, the pixel slippage corresponding to Ei appears on the scanning end side as shown in FIG. 7, while the compensating means shown in FIG. 6 divides the pixel slippage into two parts and applies one part thereof to the scanning start side. As a result, the amount of the pixel slippage is reduced by half as shown in FIG. 8.

Referring to FIG. 6, the compensating means comprises a BD counter 41 for counting the scanning start signal $DB_0$, latches 42 for storing the compensation amount in each deflecting reflection plane of the polygon 3, a multiplexer 43 for selecting one of the latches 42 in accordance with the value of the BD counter 41, and a clock counter 44 for counting the clock CL.

Before image signals are given, the CPU stores the remainder obtained by subtracting half of the count value deviation $\Delta i$ for each plane ($\Delta i$ is positive or negative) from the counted number of clocks corresponding to a reference delay time in the latches 42. When an image is formed on the photoconductive drum 6, the BD counter 41 is first reset in response to the polygon synchronizing signal PS, the scanning start signal $BD_0$ is generated in each scanning by each deflecting reflection plane of the polygon 3, and the value of the BD counter 41 is updated and transmitted to the multiplexer 43. As a result, the multiplexer 43 selects the corresponding number of the clocks from the latches 42 in each scanning of each plane of the polygon 3, and outputs the number to the clock counter 44.

The clock counter 44 is reset in response to the scanning start signal $BD_0$ and simultaneously sets the output of the multiplexer 43 as an initial value. The clock counter 44 is a down counter and outputs the above-mentioned horizontal synchronizing signal HSYNC after counting the clocks CL a predetermined number of times. The horizontal synchronizing signal HSYNC is output to a dividing circuit 45, and then the dividing circuit 45 divides the clock CL and outputs the image signal transmitting clock R.C.

According to the above operations, if the timing of the image signal transmitting clock, that is, the phase, is changed for each scanning line, the image forming start position on each scanning line is shifted by $-E_i/2$ from the reference position. As a result, the amount $E_i$ of the jitter error is divided between the scanning start side and the scanning end side as shown in FIG. 8, and the influence of the scanning speed deviation can be reduced.

Although the amount $E_i$ of the jitter error is divided between the front and rear ends of the image area by the compensating means, it may be divided among several points in the scanning line.

Figure 9:
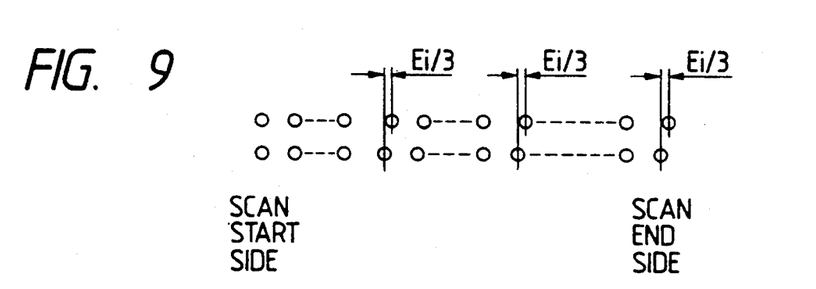

FIG. 9 schematically shows an embodiment of printing in which the pixel slippage is reduced in the compensation positions and bad influences on the image are further reduced by dividing the amount $E_i$ of the jitter error among three points.

Although the two jitter error compensating means compensates for jitter by controlling the timing, that is, the phase of the image signal transmitting clock, jitter compensation can be also performed by changing the cycle of the image signal transmitting clock itself. In other words, the cycle of the image signal transmitting clock is made short for the deflecting reflection plane of the polygon, whose scanning speed is high, during scanning, and the cycle of the image signal transmitting clock is long for the deflecting reflection plane of the polygon, whose scanning speed is low, thereby aligning the pixel print positions (image starting positions).

Furthermore, although the measuring means measures the time it takes for the light beam to pass by the predetermined distance between the two points on the scanning start side and the scanning end side, it is possible to measure the distance at which the light beam passes in a predetermined period so as to measure the cyclic change in the scanning speed.

Figure 10:
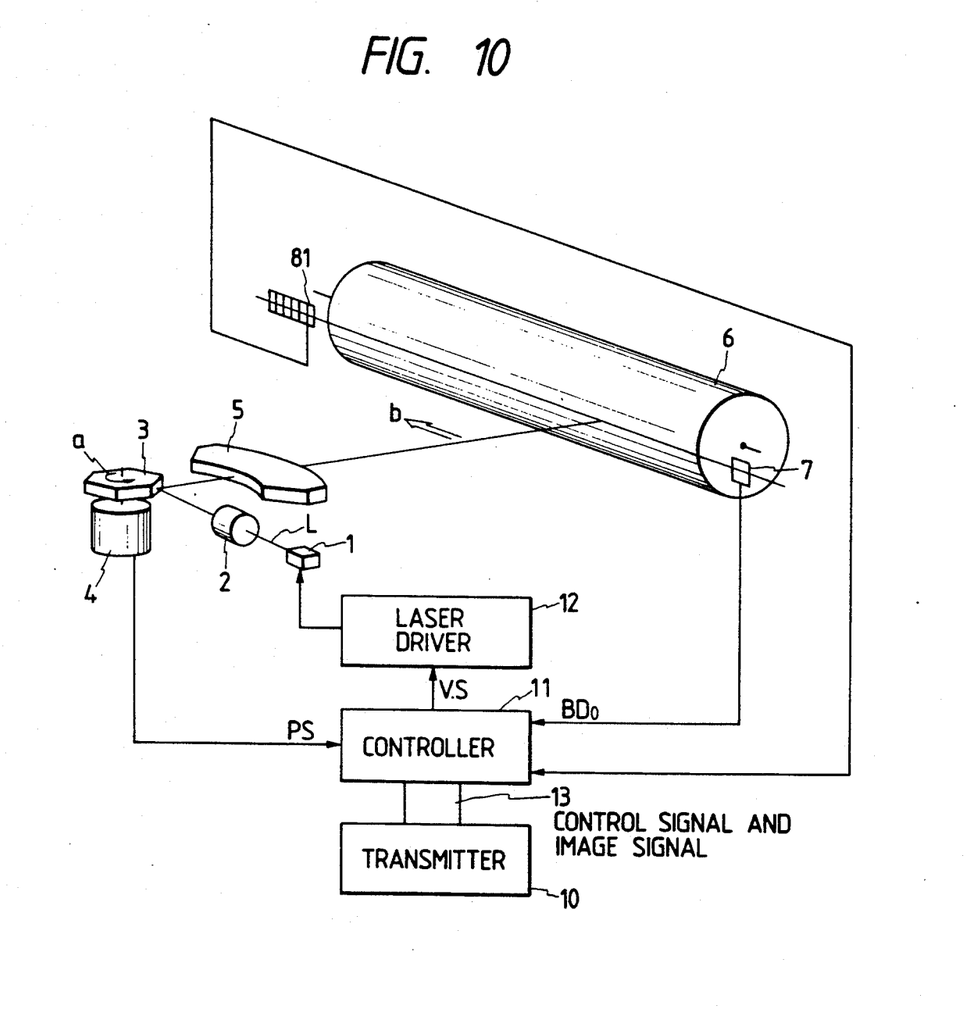
FIG. 10 is a view of another embodiment of a scanning speed measuring portion of the present invention.

FIG. 10 shows a light beam sensing means in this type of measuring means. An imaging device 81, such as a CCD, in which many photoelectric conversion elements are arranged in the scanning direction, is mounted on the side opposite to the BD sensor 7 across the photoconductive drum 6.

In this composition, although the light beam scans between the BD sensor 7 and the CCD 81 in the direction of the arrow b, a pulse light emission arises on the CCD 81 when a predetermined time has passed after the light beam has passed on the BD sensor 7. As a result, the exposure distribution is formed on the CCD 81. However, if the scanning speed is changed in each scanning, the exposure distribution is shifted on the CCD 81 in the scanning direction in each scanning. In other words, the distance at which the light beam moves in a predetermined period is changed. Therefore, the detection of the amount of the shifting corresponds to the detection of the amount of the change in the scanning speed in each scanning.

As described above, according to the present invention, since a cyclic change in the scanning speed in each scanning is measured by an appropriate means and the control of the radiation of the light beam from the light source is changed, it is possible to prevent an image from being deteriorated by a jitter error on a medium to be scanned.

What is claimed is:

1. A light beam scanning apparatus, comprising:
   a light source;
   deflecting means for scanningly deflecting a light beam from said light source;
   drive means for driving said light source;
   measuring means for detecting the light beam deflected by said deflecting means and measuring the scanning speed of the light beam, said measuring means having a first light sensing unit provided at a scanning start side for detecting a scanning start signal, and a second light sensing unit provided at a scanning end side, said second light sensing unit including a plurality of photoelectric conversion elements arranged in a scanning direction; and
   control means for controlling said drive means in accordance with said measuring means.

2. A light beam scanning apparatus according to claim 1, wherein said deflecting means has a plurality of deflecting reflection planes.

3. A light beam scanning apparatus according to claim 2, wherein said measuring means measures a cyclic change in the scanning speed of the light beam deflected by each of said deflecting reflection planes of said deflecting means.

4. A light beam scanning apparatus according to claim 1, wherein said control means changes an image signal transmitting clock in accordance with signals from said measuring means.

5. A light beam scanning apparatus according to claim 1, wherein said drive means drives said light source in accordance with the scanning start signal.

6. A light beam scanning apparatus according to claim 1, wherein a pulse light emission arises on said second light sensing unit when a predetermined time has passed after the light beam deflected by said deflecting means passes said first light sensing unit.

7. A light beam scanning apparatus, comprising:
   a light source;
   a photoconductive member;
   deflecting means for scanningly deflecting a light beam from said light source to scan said photoconductive member;
   drive means for driving said light source;
   measuring means for detecting the light beam deflected by said deflecting means and measuring the scanning speed of the light beam, said measuring means having a first light sensing unit provided at a scanning start side for detecting a scanning start signal, and a second light sensing unit provided at a scanning end side, said second light sensing unit including a plurality of photoelectric conversion elements arranged in a scanning direction; and
   control means for controlling said drive means in accordance with said measuring means.

8. A light beam scanning apparatus according to claim 7, wherein said drive means drives said light source in accordance with the scanning start signal.

9. A light beam scanning apparatus according to claim 7, wherein a pulse light emission arises on said second light sensing unit when a predetermined time has passed after the light beam deflected by said deflecting means passes said first light sensing unit.

10. A method of detecting a variation of a scanning speed of a light beam in a light beam scanning apparatus, said method comprising the steps of:
    disposing a first light sensing unit on a scanning start side of the light beam for detecting a scanning start signal and a second light sensing unit in which a plurality of photoelectric conversion elements are arranged in a scanning direction of the light beam on a scanning end side of the light beam;
    scanning the light beam and causing a pulse light emission to arise on said second light sensing unit when a predetermined time has passed after the scanned light beam has passed said first light sensing unit; and
    detecting a variation of a scanning speed of the light beam from an output of said second light sensing unit.

11. A method of detecting a variation of a scanning speed of a light beam in a light beam scanning apparatus, said method comprising the steps of:
    scanning the light beam;
    measuring a distance where the scanned light beam moves in a predetermined time; and
    detecting a variation of a scanning speed of the light beam from said measured distance.

12. A method according to claim 11, wherein said measuring step includes the step of forming an exposure distribution at the predetermined time on a light sensing unit in which a plurality of photoelectric conversion elements are arranged in a scanning direction of the light beam.

* * * * *

UNITED STATES PATENT AND TRADEMARK OFFICE
CERTIFICATE OF CORRECTION

PATENT NO. : 5,138,479
DATED : August 11, 1992
INVENTOR(S) : Toshinori Ando

It is certified that error appears in the above-identified patent and that said Letters Patent is hereby corrected as shown below:

Column 3, line 46, "a" should read --at--.

Signed and Sealed this

Twenty-eighth Day of September, 1993

Attest:

BRUCE LEHMAN

Attesting Officer

Commissioner of Patents and Trademarks